Aug. 8, 1933.                C. L. TODD              1,921,107
         SUSPENDED ARCH FOR FURNACES AND TILE THEREFOR
                       Filed July 30, 1932
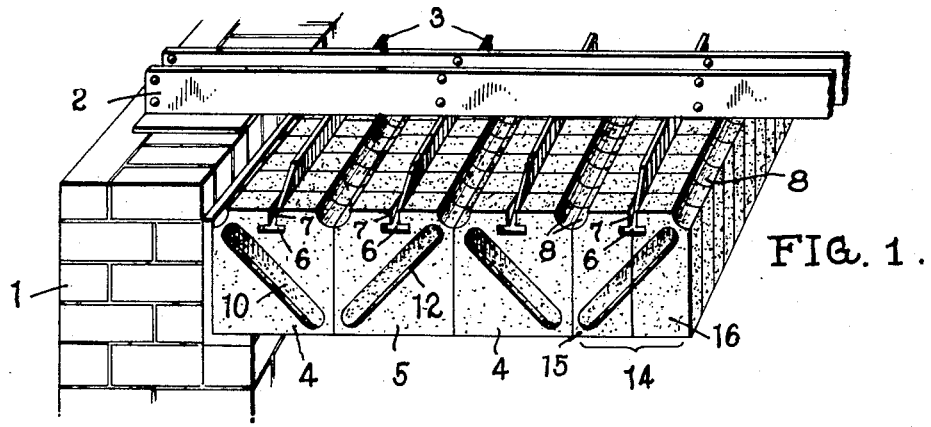
FIG. 1.
FIG. 2.   FIG. 3.   FIG. 4.   FIG. 5.
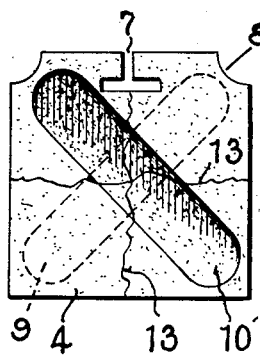 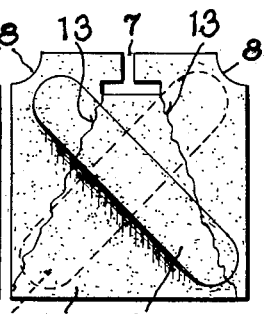 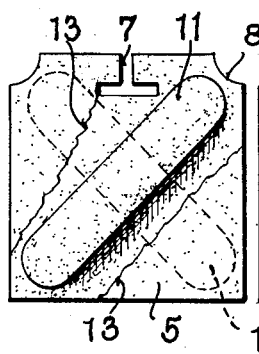 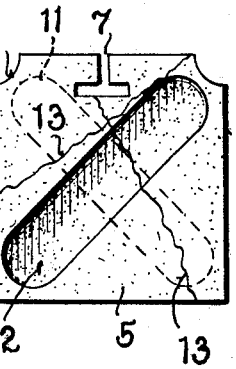
FIG. 6.
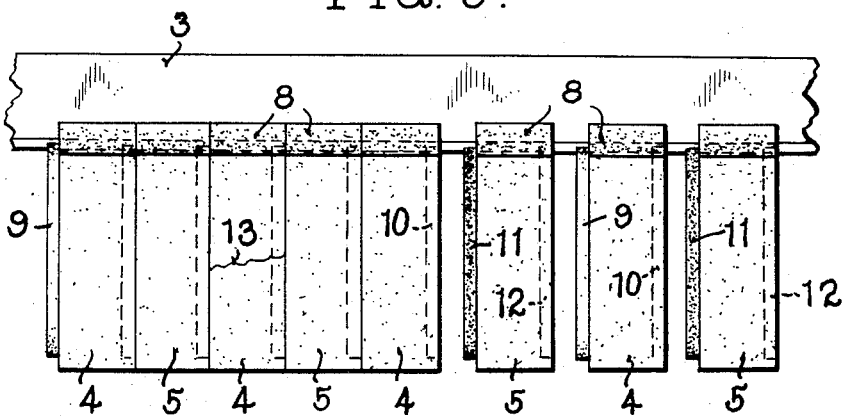
INVENTOR
Clarence L. Todd
BY
Dyne + Kirchner
ATTORNEYS Patented Aug. 8, 1933

1,921,107

UNITED STATES PATENT OFFICE 1,921,107

SUSPENDED ARCH FOR FURNACES AND TILE THEREFOR

Clarence L. Todd, Pittsburgh, Pa.

Application July 30, 1932. Serial No. 627,005

13 Claims. (Cl. 72—55)

My invention relates to suspended arches and to a novel type of tile especially useful in suspended arches for furnace roofs.

While the invention is of wide utility in the fabrication of arches generally, it will be found particularly useful in the building of suspended arch furnace roofs and will therefore be described in this application for Letters Patent in terms of such structures by way of exemplification and not limitation.

Furnace roofs of the type to which this invention has particular reference are built up of a plurality of courses of separate tile units made of refractory material. Although considerable progress has been made in perfecting formulæ and methods of making the tile to render them resistant to the structural stresses induced by the temperature conditions prevailing during normal operation of the furnace, even the best tiles now available are found to be unsatisfactory because of their tendency to spall and break down. This spalling is the result, not so much of the high temperatures to which the tiles are subjected, but rather of the alternate expansion and contraction consequent upon fluctuations in temperature. Thus, tiles used in metallurgical and boiler furnaces, where the temperature remains substantially constant during relatively long periods of time, are found to endure much longer than similar tiles used in incinerator furnaces where the temperatures are not especially high but are subject to wide, frequent and sudden fluctuations resulting from the introduction of new charges of cold, wet garbage or debris at very short intervals of time.

Garbage incinerators attain temperatures as high as 1800° F. They are capable of burning material having as much as 60 per cent water, and their temperature drops suddenly to approximately 1300° F. upon the introduction of a standard charge of such material. This sharp drop, together with the relatively slow rise which follows it, occurs many times during the working day, and its effect on the furnace roof is to set up alternate contraction and expansion which is highly destructive of the tile elements. The tiles therefore develop fractures and the fractured portions drop off into the furnace. Subsequent fluctuations in temperature more quickly attack the part of the tile which remains suspended, causing further fractures and loss of tile material until in a very short time all of the tile has been lost. As soon as this occurs the furnace must be promptly shut down and the tile replaced lest the heat warp and destroy the cast iron hangers used to suspend the tile.

It has been proposed to form the tiles in various ways to cause their contiguous faces to interlock for mutual support. These interlocking expedients of the prior art have been only indifferently successful in functioning to retain, by support from an adjacent tile, a broken portion of a tile. All of the prior types of interlocking tile with which I am acquainted contain very substantial portions between the interlocking part and the end wall which become unsupported when broken off, so that such tiles fail to achieve their purpose when they suffer fractures along certain directions.

It is an important object of the present invention to provide tiles of the interlocking type which include no portion of substantial area or volume which will be left unsupported by a contiguous tile upon the occurrence of any fracture of any possible length or direction.

A further object of the invention is to provide a course of tiles each of which embodies the novel interlocking expedient which I have invented.

A still further object of the invention is to provide a suspended arch formed of a plurality of courses of tiles each of which embodies the novel interlocking portions which form the basis of the invention.

Another important object of the invention is to provide a course of tiles for a suspended arch in which each successive pair of abutting tile faces throughout the course is provided with interlocking portions which are directionally different from those of the next adjacent pair of abutting tile faces, so that a part of a tile which becomes separated from the main body of the tile by a fracture occurring between an end wall of the tile and the interlocking portions provided on one of the tile faces (and hence receives no support from the interlocking portions on that face) will nevertheless be supported by the directionally different interlocking portions provided on the other face of the tile.

Other and further objects will be apparent from a consideration of the accompanying drawing and the appended specification which illustrate and explain the invention in a preferred form of embodiment.

In the drawing, in which like reference characters designate like parts in the several views, Figure 1 is a vertical sectional perspective view of an upper side wall and roof of a furnace showing an embodiment of the invention;

Fig. 2 is a side view of an embodiment of one of the two types of cooperating tiles;

Fig. 3 is a side view of the tile of Fig. 2, showing the opposite face of the tile;

Fig. 4 is a side view of a tile which interlocks with the tile shown in Figs. 2 and 3;

Fig. 5 is a side view of the tile of Fig. 4, showing the opposite face of the tile; and Fig. 6 is a side view of a hanger, showing in end elevation part of a course of tile associated with the hanger, certain of the tiles being assembled in operative position, and others being shown expanded to illustrate the cooperating tongues and grooves.

Referring now to the drawing, Fig. 1 shows in sectional perspective a portion of a furnace roof of the suspended arch type embodying the present invention. The reference numeral 1 indicates a side wall, which may be made entirely of refractory brick, or may be any ordinary masonry wall for supporting the weight of the roof, faced with a furnace lining of fire brick. Supported by the side walls are a plurality of suspension bars 2, to which are secured a series of transverse hangers 3 which directly engage and support the tiles 4 and 5.

It is to be understood at the outset of this description that the particular means and arrangement for suspending the individual tile elements are matters for selection and are not of the essence of the present invention. Thus, I have shown hangers 3 provided with oppositely directed horizontal flanges 6 along their lower edges, which are engaged in complemental T-slots 7 in the upper part of the tiles. Another satisfactory suspension arrangement contemplates inwardly recessing a projecting portion formed on the upper part of each tile and engaging a metal clip, hung from suspension bars or otherwise, with the recesses. In either of these two suggested forms of suspension every course need not be directly engaged with the hangers, but intermediate courses may be formed of tile which are shouldered to engage corresponding shoulders on the tile of the directly supported course. Still different means for supporting the tile are well known and will readily suggest themselves to persons skilled in the art.

The tiles may be of any desired shape, but are preferably substantially rectangular in outline. It is generally considered advantageous to indent slightly the upper corners of the tile, as shown at 8 in the drawing, for the double purpose of effecting an economy of material and increasing the exposed surface of the roof to promote radiation of heat. Of course the dimensions and general proportions of the tiles are unimportant insofar as the principles of the invention are concerned, but merely by way of example it may be stated that what may be regarded as a standard size tile for incinerator furnaces is 3 inches thick, 9 inches high and 9 inches wide, with its upper corners recessed along a radius of 1 inch, and its T-slot indented 1 inch from the top surface of the tile.

Each tile has a tongue formed on one of its two side faces, and a complemental groove on its opposite side face. The faces are otherwise plane and unbroken. The end faces are preferably smooth and adapted to lie in parallel vertical planes when the tile is suspended in place in an arch, in order that the abutting end faces of the tiles of adjacent courses may engage each other relatively snugly and may collectively oppose the escape of convection currents of heated gases.

Each tongue and groove may be substantially rectangular in outline, preferably with rounded corners. The tongue and groove of each tile extend substantially diagonally across their respective side faces of the tile, i. e., the long dimension of the tongue and groove extends along an imaginary line connecting diagonally opposite corners of the face, and the tongue and groove of each tile are directionally opposite or cross each other. In other words, in the case of each tile, the tongue extends between two diagonally opposite corners, and on the opposite side face the groove extends between the remaining two corners, as shown in the drawing, Figs. 2 to 5, inclusive, where the full lines indicate the tongue or groove visible on the viewed face of the tile, and the broken lines indicate the corresponding groove or tongue on the reverse face.

The long dimension of each tongue and groove preferably extends well into the corners of the tile, and in the case of tiles of the dimensions suggested hereinabove the width of the tongue may be two and one-sixteenth inches and the width of the groove may be two and one-eighth inches, this difference constituting sufficient tolerance to allow the tongues and grooves to interfit unfailingly notwithstanding permissible discrepancies in manufacture. The thickness of the tongue and of the groove may be, in the example used, three-eighths inch.

Since the tongue and groove of each tile are crossed, and must interfit with the groove and tongue respectively of an adjoining tile, two types of title must be provided. One type, which may be called a "right", has the tongue extending from the upper right hand corner to the lower left hand corner of the tongued side face, and the other type, which may be called a "left", has its tongue extending from the upper left hand corner to the lower right hand corner of the tongued side face. In the drawing the lefts are designated 4 and the rights 5, the tongues and grooves of the lefts are marked 9 and 10 respectively, and the tongues and grooves of the rights are marked 11 and 12 respectively. It will be evident that throughout a course of tiles formed of alternate rights and lefts, the tongues and grooves of contiguous tiles will interfit and interlock the tiles together, as shown in Fig. 6, where the five tiles at the left hand side of the figure are assembled in final operative position, and the three tiles at the right hand side of the figure are shown spaced apart to illustrate the positions of their tongues and grooves and the manner in which they interfit when the tiles are slid along the hanger 3 into engagement with each other.

It is believed that the manner in which the interlocking tongues and grooves function to prevent loss of broken off portions of tile will now be obvious. In Figs. 2 to 5 I have illustrated by irregular lines designated 13 a full variety of all the types of fracture to which the tiles are subject. It will be noted that the portion of the tile separated from the main body of the tile by each and every one of these fracture lines remains supported, on one side face or the other of the tile, by the interfit of the tongue or groove of the tile with the corresponding groove or tongue of the contiguous tile. In other words, every fractured portion, regardless of its location and the direction and length of the fracture line, is supported against falling by an interlocking tongue and groove having a horizontal component, either the tongue or the groove being itself supported directly by the tile in which it is formed or indirectly through the medium of some other tile in the course.

It will be found upon examination of the illustrations in the drawing that all possible broken portions of tile are thus supported, with the exception only of very small portions in the lower corners below the ends of the tongues and grooves. The area and volume of these portions are reduced to a negligible minimum by projecting the tongues and grooves well down into the lower corners of the tiles. Furthermore, it will be obvious that any number of adjacent tiles may be fractured along any planes whatever and the broken off portions of all of the contiguous fractured tiles will be supported as long as any interfitting tongue and groove anywhere throughout the course remains supported.

In some cases it is desirable to make the tile units of the divided type, i. e., each tile is cast as two half tiles, each half being bounded by one-half of the T-slot and a plane connecting the center of the T-slot with the center of the bottom face of the tile. This construction is illustrated by the tile designated 14 in Fig. 1, shown including the two halves 15 and 16. It will be obvious that this modification in no way interferes with the structure and function of the features of the invention per se.

While I have described this invention in terms of embodiment in a suspended arch, it will be obvious that the novel tile elements which I have invented are adapted to be used in the formation of other types of arch as well. Thus, sprung arches are usually built up of a combination of wedge brick and straight brick in order to achieve the desired curvature. If a wedge brick with a relatively flat taper is used, difficulty is experienced by the gradual spalling of the wedge bricks, resulting, upon release of compression in the arch by destruction of a wedge brick, in collapse of the whole arch. It is evident that both the wedge tiles and the straight tiles of a sprung arch may be constructed with the novel tongues and grooves described hereinabove, whereby spalling of any individual tile of the arch, or of any number of tiles, cannot result in dropping of the tile material. It is to be understood therefore that the invention is not limited to suspended arches, nor to tile elements used in suspended arches, but covers other types of arches and tile elements used therefor.

It will be obvious also that the invention has been illustrated and described herein in certain preferred forms of embodiment only, and it is to be understood that such description and explanation have been for the purpose of exemplification merely. The invention is capable of embodiment in other and further modified forms, and all such other embodiments, to the extent that they incorporate the principles of the invention as pointed out in the appended claims, are to be deemed within the scope and purview thereof.

I claim:

1. A tile for a suspended arch comprising a block having on one side face an obliquely extending tongue and having on its opposite side face an obliquely extending groove, the planes of the tongue and the groove intersecting each other.

2. A tile for a suspended arch comprising a block having on one side face a tongue extending through an area of the face between diagonally opposite corners of the block and having on its opposite side face a groove extending through an area of the face between the other diagonally opposite corners of the block.

3. A tile for a suspended arch comprising a block provided on one side face with a tongue and on its opposite side face with a groove, the longitudinal directions of the tongue and the groove being oblique to the bottom edge of the block and crossing each other at an angle.

4. A tile for a suspended arch comprising a block provided on one side face with a tongue and on its opposite side face with a groove, the longitudinal directions of the tongue and the groove being oblique to the bottom edge of the block and crossing each other at substantially right angles.

5. A tile for a suspended arch comprising a block having two opposite side faces, one face being provided with a relatively long and narrow tongue extending substantially between two diagonally opposite corners of the block, and the other face being provided with a groove, complemental to the tongue, extending substantially between the other two diagonally opposite corners of the block.

6. A tile for a suspended arch comprising a block having two opposite side faces, one face being provided with a relatively long and narrow tongue extending across the face of the block with its long dimension making an oblique angle with the bottom edge of the block, and the other face being provided with a groove, complemental to the tongue, extending across the face of the block with its long dimension making an equal oblique angle with the bottom edge of the block, the long dimensions of the tongue and the groove extending oppositely upwardly from the bottom edge of the block.

7. A tile for a suspended arch comprising a block having its opposite edges substantially parallel and having a crossed tongue and groove, both the tongue and the groove being oblique to the edges of the block, the tongue on one side face of the block, and the groove on the other side face.

8. A tile for a suspended arch comprising a block, means in the block for engaging a horizontal supporting member, and a crossed tongue and groove, one on each opposite side face of the block, the directions of the longitudinal dimensions of the tongue and the groove with respect to the sides and bottom of the block being such that when the tile is engaged with the horizontal supporting member each of said directions contains a vertical and a horizontal component.

9. A tile for a suspended arch comprising a substantially rectangular block having a crossed tongue and groove, one on each opposite side face of the block, both the tongue and the groove making oblique angles with the side and bottom edges of the block.

10. A suspended arch including a series of individual tiles, means for supporting the tiles, and means for interlocking contiguous tiles of the series comprising a tongue and a groove, one on each opposite side face of each tile, the tongues of each pair of contiguous tiles in the series being crossed, and the grooves of each pair of contiguous tiles in the series being crossed.

11. A suspended arch including a series of individual tiles, means for supporting the tiles, and means for interlocking contiguous tiles of the series comprising a crossed tongue and groove, one on each opposite side face of each tile, the tongue and the groove of each pair of contiguous tiles lying in the same oblique plane with respect to the side and bottom edges of the tiles.

12. The combination of a pair of interlocking tiles, each tile having a crossed tongue and groove, one on each opposite side face of the tile, the two tongues and the two grooves of the pair of tiles being mutually crossed, and a tongue of one of the tiles being interfitted with a groove of the other tile to interlock the tiles together.

13. A suspended arch comprising a source of individual tiles in which the abutting faces of each pair of contiguous tiles are interlocked by an interfitted tongue and groove the longitudinal direction of which contains a vertical and a horizontal component and crosses at an angle the interfitted tongue and groove which interlock the next adjacent abutting faces in the course.

CLARENCE L. TODD.

CERTIFICATE OF CORRECTION.

Patent No. 1,921,107. August 8, 1933.

CLARENCE L. TODD.

It is hereby certified that error appears in the printed specification of the above numbered patent requiring correction as follows: Page 4, line 76, claim 13, for "source" read "course"; and that the said Letters Patent should be read with this correction therein that the same may conform to the record of the case in the Patent Office.

Signed and sealed this 22nd day of August, A. D. 1933.

(Seal)

M. J. Moore.
Acting Commissioner of Patents.